3,149,017
POLYETHYLENE BALLOON
John E. Ehrreich, Arlington, Charles P. Fazio, Hull, and Beverly A. Nickerson, Concord, Mass., assignors to W. R. Grace & Co., Cambridge, Mass., a corporation of Connecticut
Filed May 24, 1961, Ser. No. 112,430
19 Claims. (Cl. 161—36)

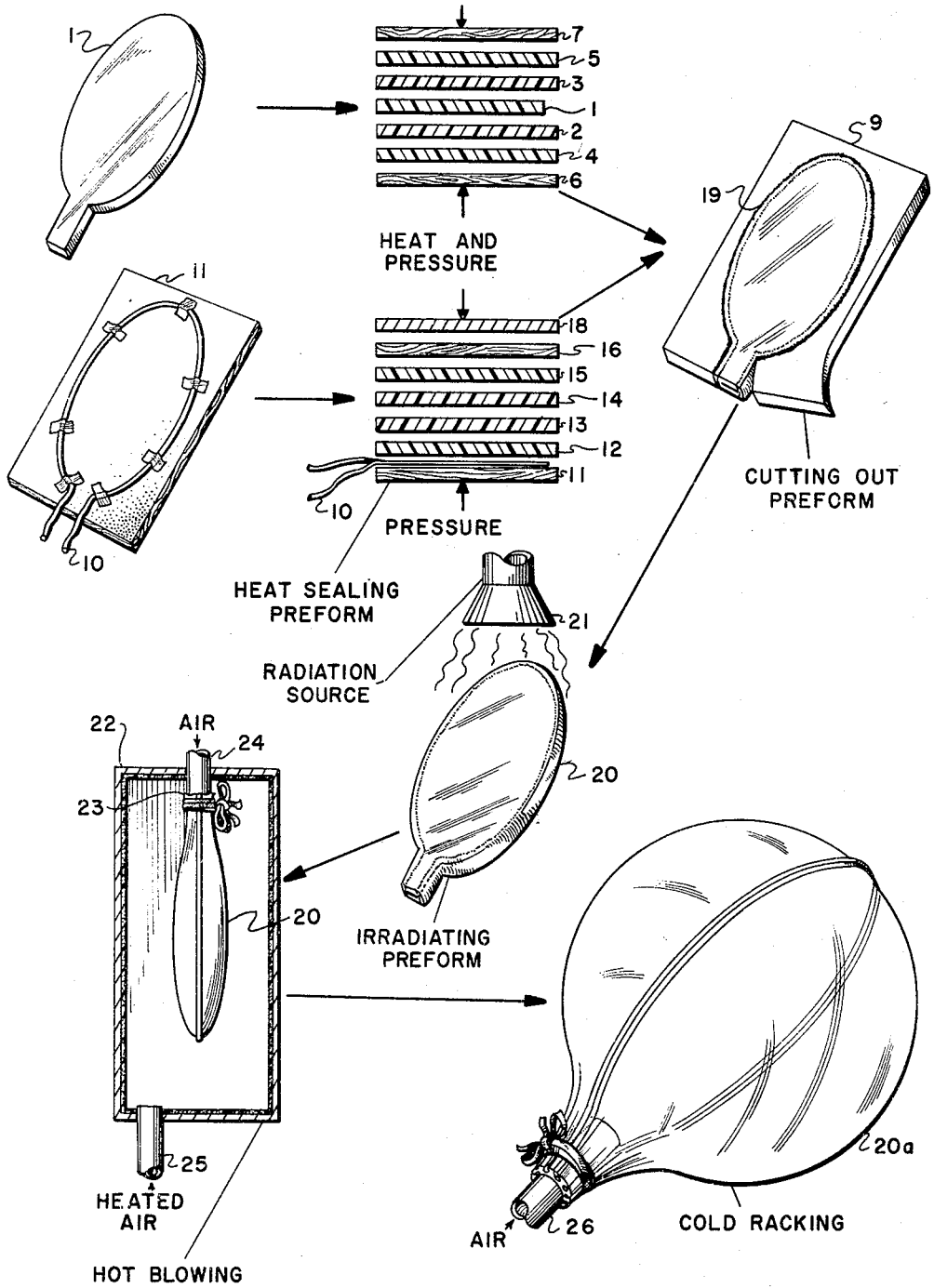

This invention pertains to the manufacture of a polyethylene meteorological balloon capable of floating at a fixed isobaric altitude for sustained periods because of its ability to withstand a considerable superpressure in flight and hold a constant volume of gas. More particularly, the present invention is concerned with the fabrication of polyethylene balloons by the steps of forming a lay-flat preform with heat sealed or fused edges, irradiating the preform and hot blowing the irradiated preform. The temperatures used for the blowing are high enough to assure that the fused seam is at a temperature above the crystalline transition temperature of the plastic for at least the first appreciable portion of the blowing.

There is an increasing demand for meteorological balloons that will float at a constant pressure altitude for extended periods. Meteorological ballons have been customarily made from expansible elastomeric films such as natural and synthetic rubbers. While ballons made from expansible films are suited for vertical soundings, they are not particularly suited for floating at a constant level for extended periods. The balloon envelope expands during the ascension of the balloon, and the altitude it reaches is determined by the final volume of the balloon. Excess lifting gas beyond that needed at the floating altitude of the balloon, or "free-lift," must be used to make the balloon rise, and lifting gas must be vented from an expansible balloon when the desired altitude and balloon volume are reached. It is difficult to maintain an expansible balloon at a constant isobaric altitude because of heating and cooling of the lifting gas relative to the atmosphere which causes the envelope to expand or contract and its lifting capacity to change.

Superpressure plastic balloons have recently been developed to overcome this problem. The plastic film used in the envelope of such a balloon is able to contain a considerable pressure and thus the balloon can be charged with "excess" gas beyond that which would fully inflate the envelope when it reaches the desired altitude. When at altitude, the superpressure or excess gas permits the balloon to stay at the selected altitude for quite some time because the excess gas keeps the envelope fully inflated despite fluctuations in the gas temperature and small gas losses through the plastic film. Constant level plastic balloons have been rather tediously made in the past by fastening together several individual spherical segments of the thin plastic film.

The balloon of the present invention is made by forming a generally circular lay-flat preform with a heat sealed edge from two sheets of polyethylene. The polyethylene preform is then irradiated or otherwise crosslinked, heated to a temperature above the crystalline transition temperature of the polyethylene and blown while hot to a greatly enlarged size. This blowing is quite readily accomplished without interference from the seamed area by careful control of the temperature of the plastic in the area of the seam.

It has been known to blow or biaxially orient irradiated and heated polyethylene films. The prior art, however, found it difficult to subject thermal seals in linear polymer films to bilateral stretching. It was found from the present experimental work that the prior art's knowledge was inadequate for the handling of seamed polyethylene sheets. Most blowing in the past has been carried out with unseamed plastics, e.g., with tubing, and at relatively low temperatures in the order of 90° to 100° C., which is below the temperature at which the crystalline phase of polyethylene disappears.

When attempting to blow a seamed product, formed from two sheets of polyethylene, below about 100° C., the seam causes distortion of the bag because it is the strongest part. If the total fluid pressure used to blow the product becomes too great, the bag will rupture at the seam. This is because of the thickness of the seam and because a stress gradient exists in the plastic sheet at the seam which reduces the effective tensile at the seam to about one-half of that existing in the plastic film or sheet remote from the seam. This stress gradient in the seamed area results in points of stress concentration and rupturing of the bag before the film remote from the seam has been sufficiently elongated to develop its maximum strength.

From the experiments carried out in the development of the present invention, it was found that these points of stress concentration cannot be avoided simply by heating the polyethylene to its softening point. It is necessary to heat the polyethylene in the area of the fused seam to a working temperature above its crystalline transition point and to maintain this working temperature in the area of the seam for at least an appreciable portion of the blowing. The working temperature required for most polyethylene falls in the range of about 103° to 104° C. For polypropylene, it is in the range of about 160° to 180° C. This is a considerably higher working temperature than the art has suggested for working with unseamed sheets.

It was surprising to find that films of adequate strength could be obtained by blowing at such elevated temperatures. The tensiles of the films increased as a result of the blowing if the plastics were properly crosslinked, and this increased strength remained after the films were cooled down under tension. It is believed that the art was unaware that the amount of stretch a partly crystalline, partly crosslinked linear olefin polymer can undergo at a temperature above its crystalline transition temperature is essentially or about the same as that which can be obtained below its transition temperature, and that the strength and rigidity of the polymer could be greatly increased by racking at such an elevated temperature.

The polymer used should have a fair amount of crystallinity so that it is susceptible to orientation and strengthening to develop the relatively high film strengths needed to withstand the superpressures encountered during the flight of the ballon. For polyethylene and polypropylene, the preferred polymers, the crystallinity at ambient conditions prior to irradiation is in the order of 30 to 95 weight percent.

It is necessary to work with crosslinked linear polymers in this invention because such crosslinked polymers do not have true melting points, and retain strength above the crystalline transition point. This crosslinking can be obtained by various methods such as with chemical crosslinking agents which are heat activatable at a temperature above the melting point of the polymer. The use of high energy ionizing radiation is preferred, as will appear. The crosslinking occasioned by irradiation occurs mostly in the amorphous or chain branching area of the polymer structure, and as crystallinity increases, the amount of radiation needed to develop equivalent strengths decreases somewhat. While irradiation destroys crystallinity and thus tends to reduce the strength that can be imparted by orientation of the crystals, the amount of radiation used in the present invention—2 to 20, preferably 8 to 16, megarads—results in an effective increase in tensile because the strength imparted by the crosslinking exceeds that lost by decreased crystallinity. A rad equals 100 ergs per gram of energy imparted by ionizing radiation to a material. A megarad is one million rads, and equals 4.5 kilowatt-seconds per pound.

There is an upper limit on the amount of radiation that can be used. Undue crosslinking of the plastic decreases the amount of film elongation that can be obtained. While increased crosslinking increases the tensile strength of the film, excessive crosslinking limits the percent biaxial elongation that can be imparted by blowing.

In working with the partly crosslinked, partly crystalline polymers, as the film or sheet is stretched the film becomes stronger or its tensile increases and more total force is required to obtain further stretching even above the crystalline temperature. With uncrosslinked linear polymers, the total force required to stretch the film at elevated temperatures becomes less as the film becomes thinner, which when blowing a bag causes weak areas in the film, especially with respect to a seam, and the bag ruptures. When stretching an uncrosslinked polymer at a temperature below its melting temperature, there is an increase in tensile, but this increase is not sufficient to cause extension of undeveloped areas, particularly at seams. When a linear polymer which is partially crosslinked is stretched, however, the rate of strength increase per unit area of cross section, at temperatures near or above the crystalline transition temperature, exceeds the rate of loss of strength because of the reduction in cross sectional area. The total force required to continue elongation of the film increases as the cross sectional decreases and the applied force thus acts on the thicker portions of the film that have not yet developed maximum unit strength. This provides self regulation of the blowing process.

It is believed that the strength of the linear polymer film is predominantly a result of three molecular phenomena—orientation of the crystal structure, crosslinking, and chain entanglement. During blowing above the crystalline transition temperature where crystallinity is absent, the polymer chain segments between points of crosslinking which are initially in a random order, are stretched and slip or slide together into a tighter locking engagement or more ordered alignment, which accounts for the increased strength. This slipping continues until a maximum strength is reached, after which further stretching results in rupturing of the film. When the stretched polymer is cooled and crystallized, the ordered alignment is frozen into position and a film of high strength in the direction of orientation is obtained.

Stated somewhat differently, if the seamed area of the plastic sheet has some crystallinity during the initial stages of blowing, the force required for stretching the film is greater than the force required to rupture the film at the points of stress concentration along the seam, because of the strength imparted to the seam by the crystallinity besides the strength of crosslinking and molecular entanglement. Also, because the seam is roughly twice as thick as the sheet, it requires about twice as much force as the force on the film to stretch it, and this leads to non-uniform expansion. Heating the plastic above the transition temperature causes the crystal structure and the strength associated with it to disappear, and leaves the plastic in the seam more amenable to flow. The crystal band forces are eliminated, molecular movement is greatly increased and drawing and alignment of the polymer chain segments between points of crosslinking can be accomplished with relatively small stresses.

In the absence of crosslinking, the ability of the polymer to flow at elevated temperatures would approach that of a viscous liquid. With true liquid flow, the response or movement of a liquid to a force is independent of the shape of the liquid. In the present invention, the dependence of the seam strength on seam thickness is largely removed by exceeding the crystalline transition temperature whereby about the same internal fluid pressure in the bag that will stretch the film also will stretch the double thick seamed area. True liquid conditions in the seam are not reached, however, because of the crosslinking. The crosslinking results in the plastic in the area of the seam displaying some tensile or cohesive strength above the crystalline transition temperature and contributes to the increase in strength that results from the stretching. If the plastic in the seamed area is stretched further than the plastic in the film, its resistance to further stretching increases and the film area is thus forced to expand.

While the irradiation makes the seamed area sufficiently strong to be coherent and to stand racking at elevated temperatures, it does not so remove the liquid characteristics of the heated plastic as to prevent it from being substantially independent of thickness.

While it is necessary to have the plastic in the area of the seam above its crystalline transition temperature, the plastic in the film or sheet areas may or may not be above the crystalline transition temperature. It is preferred to start the blowing operation with the plastic remote from the seamed area at a temperature of at least 90° C. The plastic in the film will usually be above the crystalline transition temperature at the start of blowing because of the method used to heat the seamed area. The plastic in the film, however, will cool faster during the blowing than the plastic in the area of the seam because it is thinner. Thus, the plastic in the film will develop some crystallinity and strength more rapidly than the plastic in the area of the seam. This helps to assure that the total force required to elongate the film at least equals or at times slightly exceeds the force required to elongate the seam.

A major part of the molecular alignment imparted by the hot racking is frozen into the film as crystal orientation when the racked polymer is cooled, while maintaining it under tension, to below the crystalline transition temperature. Full orientation of the crystallites is not obtained, however, because it is possible to cold rack the plastic and further appreciably increase crystal orientation and strength.

It is important that the seals in the lay-flat preforms of this invention be made by heat fusion of the polyethylene sheets in the seamed area to obtain a homogeneous seal having no or little discontinuity in it, i.e., to cause disappearance of the original boundary between the two sheets. The forming of the seam cannot be done after irradiation of the plastic because the crosslinking prevents homogeneous fusion. The fused seam must be irradiated and crosslinked, however, to give it the necessary coherence during the high temperature blowing.

It will be apparent that the present method of bi-laterally stretching a fused seam in a plastic sheet is useful in the manufacture of other types of bags or containers other than balloons. For example, the lay-flat preform can be hot blown inside a container such as a 55 gallon drum to form a liner therefore. The same method can be used to line pipe, starting with a greatly elongated seamed preform. Railroad tank cars and highway trailers can be lined in the same manner using superheated steam, for example, as the fluid blowing agent. The present technique can also be applied to the orientation of seamed flat sheets rather than just to preforms which define an enclosed volume capable of sustaining an internal fluid pressure. Thus two large sheets can be overlapped at one edge, heat sealed, irradiated, and elongated by mechanical, bi-lateral stretching while maintaining the seam at a temperature above the crystalline transition temperature of the plastic.

It is an object of this invention to provide the art with a method of biaxially stretching a sheet of a partly crystalline and partly crosslinked linear olefin polymer and having a fused seam therein, to the extent of at least developing a 100 percent increase in tensile strength as measured through the seam, without rupturing the plastic.

A more particular object of this invention is the manufacture of a container of a biaxially oriented linear polymer film having thin walls under about 5 mils thick starting from a lay-flat preform having a heat and pressure fused edge seam. The sheet plastic used in the preform preferably has an initial thickness in the range of 5 to 40 mils. A mil equals 0.001 inch.

A further object is the fabrication of a constant pressure altitude meteorological balloon capable of maintaining a substantially constant volume despite considerable variations in the gas pressure with the balloon, by hot blowing a lay-flat preform having but one seam and formed from sheets of a partly crystalline, partly crosslinked linear olefin polymer. The superpressure the balloon of the present invention is able to contain is a function of its diameter, film thickness and strength and operating altitude, and may be as high as 50 millibars or higher.

In brief compass, the objects of this invention are attained by forming a seamed sheet plastic by fusing two or more sheets of a linear olefin polymer plastic under heat and pressure in a manner to achieve a homogeneous seam that has a thickness approximately equal to the sum of the thicknesses of the sheets. The polymer used has some crystallinity, a first order transition temperature above 103° C. and a tensile of at least 500 pounds per square inch at 25° C. The plastic of the seamed sheet it then crosslinked and the sheet is thereafter heated to a working temperature in the range of 1° to 35° C. above the transition temperature where the forces required to stretch the plastic largely lose their dependence on thickness. The heated seam in the sheet is biaxially stretched at least 100 percent (area increase) while maintaining the working temperature. The sheet is then cooled while maintaining tension thereon. The cooled sheet has a tensile at 25° C. at least 25 percent greater than the tensile of the unstretched sheet, as measured perpendicularly through the seam.

It is preferred to obtain the crosslinking of the plastic by irradiating with high energy ionizing radiation. It is also preferred to further develop the strength of the seamed plastic sheet after it is cooled by cold racking it at least an additional 5 percent (area increase).

A preferred embodiment of this invention is concerned with the fabrication of a bag from an irradiated lay-flat plastic preform having but one continuous edge seam with an opening therein. The plastic is a linear olefin polymer that is in part crosslinked, in part crystalline, and has a first order transition temperature above 103° C. and a tensile at 25° C. of at least 4000 pounds per square inch after elongation, as measured through the seam. The seam is formed prior to irradiation by fusing two or more sheets of the plastic to form the lay-flat preform. The biaxial orientation is imparted after the irradiation by exerting a fluid pressure within the bag while maintaining the plastic in the area of the seam above its crystalline transition temperature. This orientation is followed by cooling to below the transition temperature while maintaining a fluid pressure within the bag. The seam of the bag is characterized by its homogeneity, biaxial orientation and absence of the original film surfaces between the two sheets.

This invention and the method of practicing it will become clear from the following discussion and description of the drawings attached to and forming a part of this specification.

The attached drawing illustrates two methods that have been used to form the lay-flat preform, and one method of blowing the preform to the desired film thickness and strength.

In one method, a Teflon (a tetrafluorethylene resin, E. I. du Pont de Nemours & Co.) insert 1 was used to form the lay-flat preform. It is separately illustrated to show its shape. The Teflon insert was 6 mils thick and was in the form of a circle 10 inches in diameter with a neck portion 3 inches wide and 3 inches long. This Teflon insert was placed between two polyethylene sheets 2 and 3 (Alathon 14). The sheets of polyethylene each had a thickness of 18 mils. Two additional sheets 4 and 5 of 6 mil thick Teflon were then placed on either side and the whole sandwich was placed in a press between steel plates 6 and 7. The sandwich was then heated to about 200° C. for 2 minutes under a pressure of about 14 pounds per square inch. After cooling, the Teflon insert was removed from between the polyethylene sheets to give the shape indicated at 9. The area of sandwich 9 to the outside of line 19 in the drawing is the portion that was fused or heat sealed.

In the second method of preparing the preform, a 20 gauge Nichrome wire 10 was taped to a 15 x 15 x ¼ inch Masonite sheet 11. The wire had a circular diameter of about 10 inches and a neck opening with a width of 3 inches. A 6 mil Teflon sheet 12 was placed over this, and then two of the above described polyethylene sheets 13 and 14 were placed on the top. This was followed by another Teflon sheet 15 and then a 15 x 15 x ¼ inch Masonite sheet 16. A 25 pound steel plate 18 was placed on top. The Nichrome wire was connected to Variac (trademark of General Radio Corporation, Cambridge, Massachusetts), and 25 volts were applied for about 2 minutes to cause heating and sealing of the polyethylene. After cooling, the polyethylene sheets were removed. They had the configuration shown in 9 except, of course, they were fused only in the seamed area indicated by the heavier shading 19.

It can be appreciated that both of these sealing procedures are quite inexpensive as compared to the other methods for seaming polyethylene that have been suggested by the prior art. These procedures permit working with relatively thick sheets of the plastic. These methods of forming the lay-flat preform, and blowing balloons therefrom, are considerably easier than attempting to fabricate balloons from film having the final thickness desired for the balloon. Also, there is only one continuous seam as compared to a gored construction.

The lay-flat construction and methods of heat sealing permit a wide range of dimensions to be used, and considerable variation in shape. The size of the balloons that can be made is limited only by the width of the plastic sheet available and by the size of the blowing equipment. It is apparent from what has been said that other methods of forming the seam in the lay-flat preform can be used, it only being essential that complete fusing in the seam area be obtained.

A lay-flat shape illustrated at 20 was cut from the heat sealed sheet 9 by hand, although a die or other cutting means can be used. A fused seal about 0.25 inch wide was left on the preform. In some instances it may be desirable to use presized sheets and/or a mold of the desired configuration to avoid the cutting operation after the fusion step.

Preform 20 was then irradiated as uniformly as possible with 10 megarads of electron irradiation from a Van de Graaff generator 21 (High Voltage Engineering Model G5). Equivalent types of high energy ionizing radiation can be used such as gamma rays from cobalt-60, neutrons from a nuclear reactor, or X-rays.

The lay-flat preforms of this invention have the particular advantage of permitting uniform dosages to be secured as compared to the use of molded spherical, ovoid and other three-dimensional shaped preforms, whether or not they have heat sealed edges. The flat preform of this invention permits a uniform thickness to be exposed to the usually unidirectional radiation source and facilitates the setting of the irradiation conditions to obtain the requisite uniform dose. The uniformity achieved is usually in the range of ±5 percent at the dosages used, as determined by placing cellophane coated with a radiation sensitive dye on both sides of the preform and observing the color change.

The irradiated preform 20 was placed in a cabinet 22 for hot blowing. The preform was clamped to gas inlet pipe 23, and air under pressure was supplied thereto by line 24. The preform was first heated to a working temperature of 120° C. by heated air supplied by line 25. The polyethylene at this temperature was completely transparent to the eye. The air supplied by line 24 could have been heated to any desired temperature, but it was sufficient to work with the air at room temperature in this case. Other fluid agents can, of course, be used to heat and blow the balloons. Thus, nitrogen, steam, heated glycols and the like can be used in the inside and/or outside of the preform. Also, the preform can be separately heated as in an infra-red oven, and then blown with cold gas in a cold atmosphere. It is usually difficult to do this rapidly enough with large sized preforms, but it can be readily carried out with small ones. It is only essential that the polyethylene, in the area of the seam, be above the crystalline transition temperature during the first appreciable portion of the blowing, i.e., until about 100 percent elongation or greater has been obtained. The polyethylene in the remainder of the preform should be above about 90° C. When the same preforms were blown with the seams at lower temperatures in the order of 100° C., they usually extended in a localized area and burst.

In some instances it may not be desirable to uniformly heat the whole of the preform to above the crystalline transition temperature. For example, with balloons it may be desirable to have a greater thickness and strength in the neck portion of the balloon to permit it to support the weight of the instrument package. The neck can be strengthened during the hot blowing by directing a stream of cooled air over the neck portion of the preform to offset or greatly decrease expansion in that portion. Non-uniform expansion can also be obtained by varying the degree of crosslinking in different portions of the preform, e.g., the neck portion of the preform can be given a higher degree of irradiation.

In this instance, preform 20 was uniformly heated and blown to a diameter of 32 inches in about 30 seconds. This resulted in a film elongation of 1940 percent (area increase). The blown balloon was then cooled while in the cabinet by quenching to below 77° C. using water sprays. Quenching is not essential to this invention. It was only used in this case to save time.

When hot blowing was first tried in this manner, it was not expected that films of adequate strength at these temperatures could be obtained, but it was surprising to find that the films would hold up under the blowing conditions and support the weight of the preform. The blowing pressures will usually be in the range of 0.1 to 10 millibars.

The balloon 20a (not drawn to scale) thus obtained was then removed from cabinet 22 and blown while cold or cold racked. Air was supplied by line 26 at about 25° C. The fluid pressure used was 15 millibars, and the balloon expanded an additional 10 volume percent. This amounted to about a 6 percent elongation (area increase). The final film thickness reached was about 0.88 mil, ±0.2 mil. The seamed area had a width of about 10 mils and a height of about 62 mils.

This cold racking reduces the elongation of the film which usually occurs when a balloon which has not been cold racked is flown and increases film tensile strength and rigidity by 10 percent or so, probably because of crystalline orientation. This cold racking step permits the balloons to be inspected before shipment. In general, the pressure used for cold racking or blowing should be about 70 to 85 percent of the back pressure at burst. The balloon is inflated to this pressure at the start of the cold racking, and if the gas addition were stopped after the initial filling, the balloon would continue to expand and the pressure would decrease. The pressure is, however, maintained for 15 to 60 minutes by addition of gas and a 5 to 25 percent elongation (area increase) is obtained. This procedure can be repeated several times.

Several balloons of this diameter were blown in this manner using the 18 mil thick polyethylene sheets and the Nichrome wire forming method. Some of the balloons (irradiated with 10 megarads of radiation) were destructively tested and their bursting pressure was about 20 millibars, ±3 millibars, which gives a calculated working or effective film tensile of about 2800 pounds per square inch at room temperature. Sample one inch wide specimens were cut from the balloons perpendicularly through the seams. When tested, these samples gave tensiles in the range of 10,000 to 14,000 pounds per square inch (based on initial film thickness) at 25° C. on an Instron tester at a pull rate of 2 inches per minute.

A balloon about 7 feet in diameter, made by the Nichrome wire method, was flight tested. The balloon weighed 569 grams and was equipped with a 510 gram corner radar reflector, using 17 grams of cord, for a total weight of 1096 grams. The amount of helium used was sufficient to give the balloon a gross lift of 1151 grams and the balloon size and total weight resulted in a floating altitude of 38,000 feet with a super or back pressure within the balloon of 10 millibars. A tow balloon equipped with a squib was used to take the plastic balloon to altitude, which was reached in about 45 minutes. The tow balloon reduced the time necessary to reach the floating altitude and thus increased the tracking time. The balloon was tracked with radar, and remained at the desired altitude until it went beyond the range of the radar equipment.

The following table summarizes the properties (prior to crosslinking) of the polyethylene and polypropylene plastics that can be used in the practice of this invention.

| | Preferred Range | | Example—Alathon-14 [2] |
|---|---|---|---|
| | Polyethylene [1] | Polypropylene [1] | |
| Density, grams/cubic centimeter | 0.910–0.965 | 0.85–0.93 | 0.915 |
| Melt Index [3] | 0.01–9.0 | 0.3–4.0 | 1.9 |
| Molecular weight (avg.) | $10^4$–$10^6$ | $10^5$–$5 \times 10^6$ | 20,000 |
| Transition Temperature,° C. [4] | 103–140 | 160–180 | 105–110 |
| Tensile, pounds/square inch at 25° C. (as extruded 18 mil thick, 1 inch wide strip) | 500–5,500 | 500–10,000 | 1,670 |
| Crystallinity, percent [5] | 30–95 | 40–95 | 56 |
| Elongation, percent | 20–2,000 | 200–800 | 500–600 |

[1] Includes copolymers, graft polymers and blocked polymers containing up to 25 weight percent of such monomers as butene, diethyl maleate and 2-ethylhexyl acrylate.
[2] Sold by E. I. du Pont de Nemours & Co., Inc.
[3] ASTM D-1238-5T (at 190° C. for polyethylene, 230° C. for polypropylene).
[4] As determined by crossed polarizers on a hot stage microscope.
[5] As determined by X-ray diffraction (approximate values).

The crosslinking of the polyethylene can also be obtained by chemical means. For example 0.2 to 2 weight percent of a peroxide can be blended with the polyethylene, the polyethylene can then be formed into sheets from which the lay-flat preform can be fabricated, and the polyethylene thereafter crosslinked by heating it to a temperature which generates free radicals from the peroxide. The polyethylene should be free from antioxidants or free-radical inhibitors. See Chemical Processing, vol. 23, No. 11, 1960, p. 72, and United States Patent 2,916,481.

More particularly, 1 weight percent of dicumyl peroxide or 2,5-dimethyl-2,5 di (tertiary butyl peroxy) hexyne-3 is blended with pellets of Alathon-14 (density of 0.914) by admixing in a blender using a petroleum-ether solution of the peroxide, and a nitrogen sweep to remove the solvent. The coated pellets are thereafter extruded as a sheet of 135° C. The lay-flat preform is then fabricated from the sheets by the Teflon insert method, using a temperature of about 185° C. and a time of about 5 minutes to activate the crosslinking agent and permit crosslinking to occur. The lay-flat preform is then blown as previously described.

The extent of crosslinking of the polyethylene can be determined from the percent gel remaining after extraction for 24 hours in a Soxhlet extractor with refluxing benzene. The crosslinked polyethylene should have a gel content in the range of 40 to 80 weight percent, preferably greater than 55 percent, to be suitable for hot blowing.

A balloon was made as follows: polyethylene (Alathon–14) pellets coated with 0.6 weight percent of 2,5-dimethyl-2,5 di (tertiary butyl peroxy) hexane were melted and extruded at 135° C. as ¼ inch rods. These were chopped into ¼ inch pellets. About 30 grams of the pellets were arranged in roughly an 11 inch diameter circle on a Teflon sheet. Another Teflon sheet was placed on top and the sandwich was heated 2 minutes under slight pressure at 275° F. The pressure was then raised to 50,000 pounds (total) for 2 minutes while maintaining the temperature at 275° F. The sheet obtained was allowed to cool. A second sheet was made in the same manner. A 9 inch diameter Teflon insert with a 3 inch wide neck was placed between the two polyethylene sheets, and two Teflon sheets were placed on each side. This sandwich was placed in a press and heated at 204° C. and 20,000 pounds (total) pressure for 10 minutes. The fused polyethylene sheets thus obtained were cooled, the Teflon insert was removed and a circular preform with a ¼ inch seam was cut out. The preform was blown in a cabinet at 124° C. with hot air, as previously described, to a 30 inch diameter. The resulting balloon was quenched with cold water. The film was about 0.5 mil thick and was exceptionally clear.

There are several ways of strengthening or otherwise improving the performance of the balloons fabricated in the manner of this invention. Four or more sheets of the plastic can be fused in the manner described to make dual or multiwall balloons. The sheets used can be of different extensible plastics. For example, in a four layer arrangement, the inner two sheets can be of polyethylene and the outer two of polypropylene. This sandwich can be then fused as described above. Polypropylene gives stronger films, but suffers from the disadvantages of cold temperature embrittlement and rapid degradation under ultraviolet radiation as compared to polyethylene; and, thus, it is advantageous to use the two types of plastics together.

One preform can be inserted into another and hot blown as a composite. In this arrangement it is preferred to have the seams of the two bags out of register. Again, different types of polymers can be used in the two preforms. It is preferred in this arrangement to first irradiate the two preforms separately and then to insert one in the other.

One balloon that has been hot blown can also be inserted in another, preferably with the seams out of register, and the two can then be cold racked together. The two balloons will adjust to complementary sizes during the cold racking. In this case it is desirable to have the neck of the outer balloon larger in diameter to permit ready insertion of the inner balloon.

Polyethylene at room temperature is somewhat gas permeable as compared to other polymers. Diffusion of gas through the polyethylene film can be decreased in several ways. For example, two 18 mil sheets of a vinylidene chloride-vinyl chloride (2 percent) polymer can be presealed to the outside of the irradiate polyethylene preform, and the composite hot blown. This will decrease the helium permeability of the balloon about 2000 percent, measured at 25° C. Alternatively, the fully blown and cold racked balloon, while inflated, has been internally coated with a 0.16 mil gas barrier film by flushing with (i.e., by swirling) a 4 percent tetrahydrofurane solution of a 98 percent vinylidene chloride–2 percent vinyl chloride copolymer therein and draining the excess out. This decreased helium permeability about 400 percent, measured at 25° C.

Most available gas permeability data indicate that polyethylene and polypropylene films are relatively more gas permeable than other types of polymer films, some 5 to 500 times more permeable for example as compared to Mylar (a polyethylene terephthalate resin, E. I. du Pont de Nemours & Co.). It would seem, therefore, that the linear olefin polymer films are not particularly suited for use in balloons, but this is not the case. Most reported permeability measurements have been made at conventional temperatures and usually with large sized gas molecules such as carbon dioxide or water vapor. The difference in permeabilities between the linear olefin polymer films and films of other types of plastics decreases with a decrease in the size of the gas molecule being contained. Also the gas permeability constant for the linear olefin polymers is much more temperature dependent, and the differences in permeability between polyethylene and Mylar, for example, become much less at the temperature encountered during flight of the balloon, —40° to —85° C. The helium permeability constants of polyethylene film and a Mylar film become equal at about —45° C., and thereafter polyethylene film has a lower permeability constant. It might also be noted that the gas permeability constant for polyethylene is relatively independent of film thickness and gas pressure.

The low temperatures encountered by the balloons in flight also has another advantage. The cold racked polyethylene balloons of this invention normally have film tensiles in the range of 10,000 to 14,000 pounds per square inch at ambient temperatures, which is well below the 20,000 to 25,000 pounds per square inch tensiles found in the Mylar films used to fabricate constant altitude balloons. The tensile strength of polyethylene film is, however, much more temperature dependent, and it will be found that at about —50° C. the tensile strength of polyethylene film about equals or exceeds that of Mylar.

It is desirable in many instances to reduce the heat absorption, improve the visibility, and/or increase the radar reflectivity of the balloons. For example, a fine metallic powder can be dispersed within the balloon and will adhere by electrostatic forces to the inner wall or film. Thus, 0.022 pound of a fine aluminum powder was poured into the neck of a deflated balloon having a 30 inch diameter. The balloon was of polyethylene made from a one-piece lay-flat preform, as above described, which initially had a ten-inch diameter and was irradiated with a 10 megarad dose of electron radiation. The balloon with the powder inside was inflated at a rapid rate (approximately in two minutes) with air which distributed the powder evenly over the inner surface of the balloon.

A method that can be used to improve radar reflectivity is to coat the inner surface of the balloon with a conductive polymer film, e.g., one containing finely divided carbon black or tin oxide. For example, a 98 percent polyvinylidene chloride-2 percent polyvinyl chloride copolymer solution in tetrahydrofurane (5 weight percent solids) was admixed with 40 weight percent of finely divided conductive carbon black. This mixture was then swirled inside of an inflated cold racked 32 inch diameter polyethylene balloon, formed as above, to give a 0.3 mil thick conductive film when dry. The polyehylene film thickness was 0.88 mil. This carbon black loaded internal film was found to be suitably conductive, besides greatly improving the gas impermeability of the polyethylene film. An aluminum coating can also be vacuum deposited on the outside of the balloon while it is inflated to give a conductive and heat reflecting film.

The balloons may also be color pigmented or coded. It is desirable in this situation to add the pigment to the second film or outer film of a dual or multiwall balloon, because pigmentation generally will adversely affect the properties of the polyethylene film. Thus, in the above-described dual wall arrangement using polyethylene as the inner film and polypropylene as the outer film the polypropylene film can be suitably colored as desired. Alternatively, when coating the inside of the balloon with a gas barrier such as polyvinylidene chloride, the polyvinylidene chloride can be pigmented or dyed.

The method of hot blowing the lay-flat preforms of this invention can be used to form bags or fluid containers other than balloons. Thus, the preforms can be blown within a confining drum or container to form a liner therefor of any desired thickness. The same method can be used to form disposable liners for tank trucks or railroad tank cars. Greatly elongated seamed preforms can be used to line pipe, even in the field, using steam to heat and blow the shape. The insides of the container or pipe or the outside of the preform can be coated as by spraying with a suitable adhesive such as a polymer of 5 parts of iso-octyl acrylate-1 part of acrylic acid or a polyvinyl acetate to improve bonding.

Precise dimensional tolerances are required of some balloons. The Robin balloon which is carried by the Arcas rocket is an example. The density of the atmosphere at high altitudes is obtained by observing the rate of free-fall of the Robin balloon. It is preferred that the Robin balloon be not more than a half percent out of round. This precision can be obtained by hot blowing the preform in a large size mold or confining structure.

The lay-flat preforms can also be used to blow mold such shapes as polyethylene bottles with fairly heavy walls, but the need for this invention is not so great in this instance because the elongations usually sought are not sufficient to result in failure at the seamed area, which is usually encountered at elongations greater than about 100 percent as previously discussed.

The biaxially oriented film of the bags made in accordance with this invention is heat shrinkable, as is known to the prior art. See United States Patent 3,022,543 (Serial Number 713,848, filed February 7, 1958). The bags can be used therefore to package various articles such as turkeys, apples in trays, tools and the like. When the film is shrunk by the application of heat as by immersion in hot water or by heating with hot air, a tight, confining wrinkle-free package results.

Having described this invention, what is sought to be protected by Letters Patent is succinctly set forth in the following claims.

What is claimed is:

1. A method of manufacturing a constant pressure altitude meteorological balloon of polyethylene film, comprising the steps of: forming a lay-flat preform by placing two sheets of polyethylene in the range of 5 to 40 mils thick each together and forming a heat and pressure sealed edge seam therein having a generally circular configuration with a necked opening, said polyethylene having a density in the range of 0.91 to 0.96, a tensile at 25° C. of at least 500 pounds per square inch, and a first order transition temperature above 103° C.; irradiating said preform within the range of 8 to 16 megarads of high energy ionizing radiation; heating the irradiated preform to a working temperature in the range of 1 to 35° C. above said transition temperature; blowing said preform by the application of internal fluid pressure to the extent of at least 100 percent film elongation (area increase) and a final film thickness under 5 mils while maintaining said edge seam at said working temperature and cooling the blown shape to below said transition temperature while maintaining internal fluid pressure.

2. The method of claim 1 comprising the additional step of cold racking the blown shape at least an additional 5 percent (area increase) by application of internal fluid pressure.

3. The method of claim 2 wherein said internal fluid pressure during cold racking is at least 70 percent of the back pressure at burst.

4. The method of claim 2 wheerin said balloon is placed within a like balloon with the seams out of register, and the composite is then cold racked.

5. The method of claim 1 wherein said seam is formed by placing between said sheets a flat flexible insert nonmelting at the conditions of forming said seam, of the shape desired and falling within the seamed area, placing on the outside of said preform pressure applying panel members, and applying heat in the area of said seam.

6. The method of claim 1 wherein a plurality of said sheets are placed together to form said preform, whereby a multiwalled balloon is obtained.

7. The method of claim 1 when sheets of a dissimilar extensible plastic are placed on the outsides of said preform prior to forming said seam, whereby a multiwalled balloon is obtained.

8. The method of claim 1 wherein the interior of said blown shape is coated by flushing with a liquid film-forming polymer system and drying.

9. The method of claim 8 wherein said polymer system is loaded with a finely-divided conductive carbon black.

10. The method of claim 1 wherein the interior of said balloon is coated by dusting with a finely divided metal, the metal particles adhering by electrostatic forces to the film.

11. A method of elongating a sheet plastic having a fused seam therein, said seam having a thickness substantially greater than the thickness of the plastic sheet and said plastic being a partially cross-linked, linear olefin polymer selected from the group consisting of polyethylene having a density of 0.91 to 0.97, an average molecular weight ranging from 10,000 to 1,000,000 and having a crystalline transition temperature of 103 to 140° C., and polypropylene having a density of 0.85 to 0.93, an average molecular weight ranging from 100,000 to 5,000,000, and a crystalline transition temperature ranging from 160 to 180° C., said plastic having a 30 to 95 weight percent crystallinity, a tensile of at least 500 pounds per square inch at 25° C. and displaying cohesiveness at a temperature above said transition temperature; comprising heating said seam to a working temperature above said transition temperature, biaxially stretching the seam so heated at least 100 percent (area increase) while maintaining said working temperature, and cooling the seam so stretched while maintaining tension thereon, the cooled sheet having a tensile at 25° C. at least 25 percent greater than the tensile of the unstretched sheet, as measured through said seam.

12. The method of claim 11 wherein said cooled sheet is cold racked at least an additional 5 percent (area increase).

13. The method of claim 11 wherein said sheet plastic is formed from two sheets continuously heat sealed at the edge to form a lay-flat preform with a gas entrance port at the seam, wherein said preform is thereafter irradiated with high energy ionizing radiation to impart said crosslinking, and wherein said stretching is obtained by inflating the preform.

14. The method of claim 11 wherein said sheet has a thickness in the range of 5 to 40 mils prior to elongation.

15. An irradiated seamed biaxially oriented sheet plastic, said plastic being a partially cross-linked linear olefin polymer selected from the group consisting of polyethylene having a density of 0.91 to 0.97, an average molecular weight ranging from 10,000 to 1,000,000 and having a crystalline transition temperature of 103 to 140° C., and polypropylene having a density of 0.85 to 0.93, an average molecular weight ranging from 100,000 to 5,000,000, and a crystalline transition temperature ranging from 160 to 180° C., said plastic having a 30 to 95 weight percent crystallinity prior to irradiation and a tensile at 25° C. of at least 4,000 pounds per square inch in its oriented state, the seam thereof being formed prior to irradiation by fusing two sheets of said plastic, the irradiation being by high energy ionizing radiation in the amount of 2 to 20 megarads and the biaxial orientation being imparted after irradiation to the extent of at least 100 percent elongation (area increase), said seam being characterized by its homogeneity, biaxial orientation and absence of the original film surfaces between said two sheets.

16. A seamed bag formed from two sheets of a biaxially oriented, partially cross-linked, linear olefin polymer selected from the group consisting of polyethylene having a density of 0.91 to 0.97, an average molecular weight ranging from 10,000 to 1,000,000 and having a transition temperature of 103 to 140° C., and polypropylene having a density of 0.85 to 0.93, an average molecular weight ranging from 100,000 to 5,000,000, and a transition temperature ranging from 160 to 180° C., said plastic having a 30 to 95 weight crystallinity prior to irradiation and a tensile of 25° C. of at least 4,000 pounds per square inch as measured through the seam, said seam being formed prior to crosslinking of the polymer by fusing said sheets in the area of said seam to form a lay-flat preform, the irradiation in the amount of 2 to 20 megarads being by high energy ionizing radiation, and the biaxial orientation being imparted after crosslinking by exerting a fluid pressure within said preform to the extent of at least 100 percent elongation (area increase) while maintaining the temperature thereof above said transition temperature, said seam being characterized by its homogeneity, biaxial orientation and absence of the original film surfaces between said two sheets.

17. The bag of claim 16 when cold racked at least an additional 5 percent (area increase).

18. The bag of claim 16 wherein said bag is confined within a container during the biaxial orientation.

19. The bag of claim 16 wherein there is a necked opening in said seam, said bag is freely suspended in a gaseous atmosphere during said orienting, and said fluid pressure is exerted by a gas, forming thereby a balloon.

References Cited in the file of this patent
UNITED STATES PATENTS

| | | |
|---|---|---|
| 2,001,785 | Hurt | May 21, 1935 |
| 2,748,048 | Russell | May 29, 1956 |
| 2,767,941 | Gegner | Oct. 23, 1956 |
| 2,948,666 | Lawton | Aug. 9, 1960 |
| 3,022,543 | Baird | Feb. 27, 1962 |

OTHER REFERENCES

Buckhoff: "Chemical Engineering," vol. 62, September 1955, pages 228, 230, 232 and 234.